(12) United States Patent
Baskey et al.

(10) Patent No.: US 7,111,038 B2
(45) Date of Patent: Sep. 19, 2006

(54) ENHANCING APPLICATION SERVER PERFORMANCE BY RELOCATING PERFORMANCE-DEGRADING PROCESSING

(75) Inventors: Michael E. Baskey, Wappingers Falls, NY (US); James C. Fletcher, Apex, NC (US); Bala Rajaraman, Cary, NC (US); Anthony R. Sager, Milan, NY (US)

(73) Assignee: International Business Machines Corporation, Armonk, NY (US)

( * ) Notice: Subject to any disclaimer, the term of this patent is extended or adjusted under 35 U.S.C. 154(b) by 835 days.

(21) Appl. No.: 10/115,499

(22) Filed: Apr. 3, 2002

(65) Prior Publication Data

US 2003/0220962 A1 Nov. 27, 2003

(51) Int. Cl.
*G06F 15/16* (2006.01)
*G06F 15/173* (2006.01)

(52) U.S. Cl. .................. 709/203; 709/224; 709/246; 719/320

(58) Field of Classification Search ........ 709/202–203, 709/219–220, 225–229, 223–224, 246; 719/320
See application file for complete search history.

(56) References Cited

U.S. PATENT DOCUMENTS

| 5,649,109 | A | * | 7/1997 | Griesmer et al. ........... 709/242 |
| 5,754,772 | A | | 5/1998 | Leaf ....................... 395/200.33 |
| 5,754,774 | A | | 5/1998 | Bittinger et al. ....... 395/200.33 |
| 5,754,830 | A | | 5/1998 | Butts et al. ................. 395/500 |
| 5,859,971 | A | | 1/1999 | Bittinger et al. ....... 395/200.33 |
| 5,870,544 | A | | 2/1999 | Curtis .................... 395/187.01 |
| 5,875,322 | A | | 2/1999 | House et al. ................ 395/561 |
| 5,875,332 | A | | 2/1999 | Wang et al. ................. 395/702 |
| 6,779,032 | B1 | * | 8/2004 | Hericourt .................... 709/226 |
| 6,934,745 | B1 | * | 8/2005 | Krautkremer ............... 709/223 |
| 6,938,257 | B1 | * | 8/2005 | Rapp et al. ................. 709/219 |

FOREIGN PATENT DOCUMENTS

| TW | 299543 | 3/1997 |
| WO | WO 97/18635 | 5/1997 |

OTHER PUBLICATIONS

Michael Jenkin and Patrick Dymond, "A Plugin-based Privacy Scheme for World-wide Web File Distribution," IEEE, System Sciences, 1998, vol. 7, pp. 621-627.
"410137—TN3270(E)—Host Based Correlation and Performance Management," Research Disclosure No. 410, International Business Machines Corporation, Jun. 1998, p. 824.
"408149—Web Transport Gateway," Research Disclosure No. 408, International Business Machines Corporation, Apr. 1998, p. 464.

* cited by examiner

*Primary Examiner*—Bharat Barot
(74) *Attorney, Agent, or Firm*—Lily Neff, Esq.; Heslin Rothenberg Farley & Mesiti P.C.

(57) ABSTRACT

An application server running an SNA application includes a TN3270 server. Performance of the application server is enhanced by relocating away from the application server the conversion of data between ASCII and EBCDIC, as well as command scanning and packaging. The relocating can take the form of, for example, a browser plug-in at the client or elsewhere. In addition, the client is able to carry on communications with the application server over a standard port by logically situating a communication server between the client and the application server. The client communicates with the communication server over the standard port, while the communication server forwards the communications to the application server over a non-standard port.

42 Claims, 5 Drawing Sheets

ENHANCING APPLICATION SERVER PERFORMANCE BY RELOCATING PERFORMANCE-DEGRADING PROCESSING

BACKGROUND OF THE INVENTION

1. Technical Field

The present invention generally relates to enhancing application server performance in a network. More particularly, the present invention relates to enhancing application server performance in a network by relocating performance-degrading processing away from the application server.

2. Background Information

Historically, most critical back-end data operations for enterprises have been implemented in mainframe computer systems, for example, SNA applications operating on a mainframe from International Business Machines Corporation (IBM). As one skilled in the art will know, "SNA" stands for System Network Architecture, a proprietary IBM architecture and set of implementing products for networking an enterprise. After the advent of the Internet, these same enterprises then wanted to be able to access these applications over networks employing TCP/IP (Transmission Control Protocol/Internet Protocol), for example, the Internet. Systems have been devised that allowed remote access to these types of applications. For example, TN3270 provides the capability to send 3270 screen controls via TCP/IP. However, communicating with SNA application servers over TCP/IP involves additional CPU processing overhead to accommodate the differing capabilities of the two protocols. This can result in an overall degradation in the performance of such servers for mission-critical applications.

For example, SNA applications use the EBCDIC data format, whereas the ASCII data format is used outside of the SNA applications. Thus, converting between these data formats is necessary. In addition, as another example, commands from the client to the TN3270 server are embedded within the data stream destined for the SNA application. Thus, the TN3270 server must scan for commands within the information flow and separate them from the data (referred herein to as "command scanning and packaging").

Still further, beyond the processing-intensive operations described above, TN3270 involves communicating with the application server over a non-standard port, port 23, which raises additional security issues beyond those already faced for Internet access. For security reasons, enterprises do not want to open up more ports in their firewalls than are absolutely necessary. The standard port that is typically opened for Internet access is port 80, and security is already in place to handle the fact that port 80 is opened.

Thus, a need exists for a way to enhance the performance of SNA application servers. A further need exists to provide a uniform model for access to SNA applications over a standard port.

SUMMARY OF THE INVENTION

Briefly, the present invention satisfies the need for enhancing the performance of SNA application servers by relocating one or more costly processes away from the application server. The present invention also satisfies the need for access through a standard port by introducing at least one communication server logically situated between a client and at least one SNA application server. Communications between the client and the communication server(s) take place over a standard port, while communications between the communication server(s) and the SNA application server(s) take place over a non-standard port.

In accordance with the above, it is an object of the present invention to enhance application server performance in a network.

It is another object of the present invention to provide client access to SNA application servers over a standard port.

The present invention provides, in a first aspect, a method of enhancing application server performance in a network. The method comprises identifying at least one performance-degrading process normally performed by at least one application, and processing it away from at least one application server running the at least one application. The processing results in enhancement of application server performance. For example, the present invention relieves an SNA application server of having to convert between ASCII and EBCDIC, as well as command scanning and packaging.

The present invention provides, in a second aspect, a method of communicating over a network between a client and at least one application server running an SNA application, the at least one application server comprising a TN3270 server. The method comprises receiving over a standard port information from the client intended for the at least one application server at least one communication server logically situated between the client and the at least one application server. The method further comprises forwarding the information to the at least one application server over a non-standard port. In this way, the communication server can communicate with the client over a standard port, utilizing the security infrastructure already in place for communications over the standard port. Thus, the access control for the client to access the application server (through the communication server) need not be different from the access control for the client to access the communication server.

System and program product aspects are also provided for each of the method aspects.

The present invention, by leveraging existing infrastructure and security for TN3270 communications, additionally provides content-based load balancing and consistently managed quality of service for network and TN3270 traffic.

These, and other objects, features and advantages of this invention will become apparent from the following detailed description of the various aspects of the invention taken in conjunction with the accompanying drawings.

DETAILED DESCRIPTION OF THE INVENTION

Figure 1:
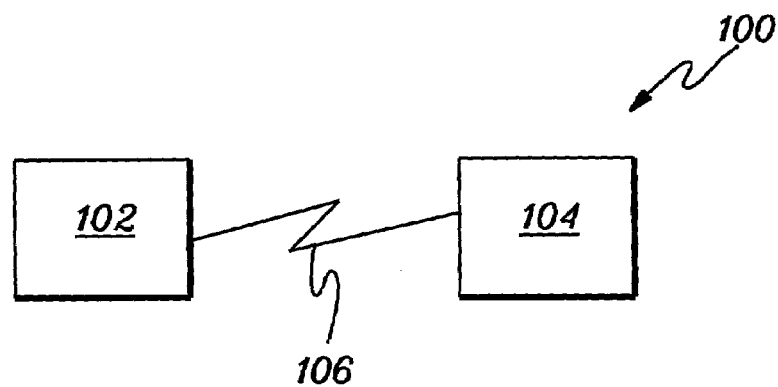
FIG. 1 depicts one example of a communication environment useful with the present invention.

One embodiment of a computing environment incorporating and using the capabilities of the present invention is described with reference to FIG. 1. A communication environment 100 includes, for instance, at least one computing unit 102 coupled to at least one computing unit 104. In one example, computing unit 102 is a server, while computing unit 104 is a client. Each unit includes, for example, one or more central processing units, memory and one or more input/output devices, as is well known in the art.

Computing unit 102 is based, for instance, on the z/Architecture offered by International Business Machines Corporation, Armonk, N.Y. The z/Architecture is described in an IBM publication entitled "z/Architecture Principles of Operation," IBM Publication No. SA22-7832-00, December 2000, which is hereby incorporated herein by reference in its entirety. One example of a computing unit based on the z/Architecture is the zSeries, running the z/OS operating system, offered by International Business Machines Corporation.

Computing unit 104 is, for example, a personal computer, such as a personal computer executing Microsoft Windows, which runs on the Intel PC architecture. Computing unit 104 could instead be, as another example, a handheld computer or communication device.

Computing unit 102 is coupled to computing unit 104 via a standard wired or wireless connection 106, such as any type of wire connection, token ring or network connection, to name just a few examples. One communications protocol used by one or more of these connections is TCP/IP.

The above-described communication environment and/or computing units are only offered as examples. The present invention can be incorporated and used with many types of computing units, computers, processors, nodes, systems, work stations and/or environments without departing from the spirit of the present invention. For example, one or more of the units may be based on the UNIX architecture. Additionally, while some of the embodiments described herein are discussed in relation to servers and clients, such embodiments are only examples. Other types of computing environments can benefit from the present invention and are thus, considered a part of the present invention.

Additionally, in various aspects of the present invention, the client need not be remote from the server. Various aspects of the invention are equally applicable to clients and servers running on the same physical machine, different physical machines or any combinations thereof.

Figure 2:
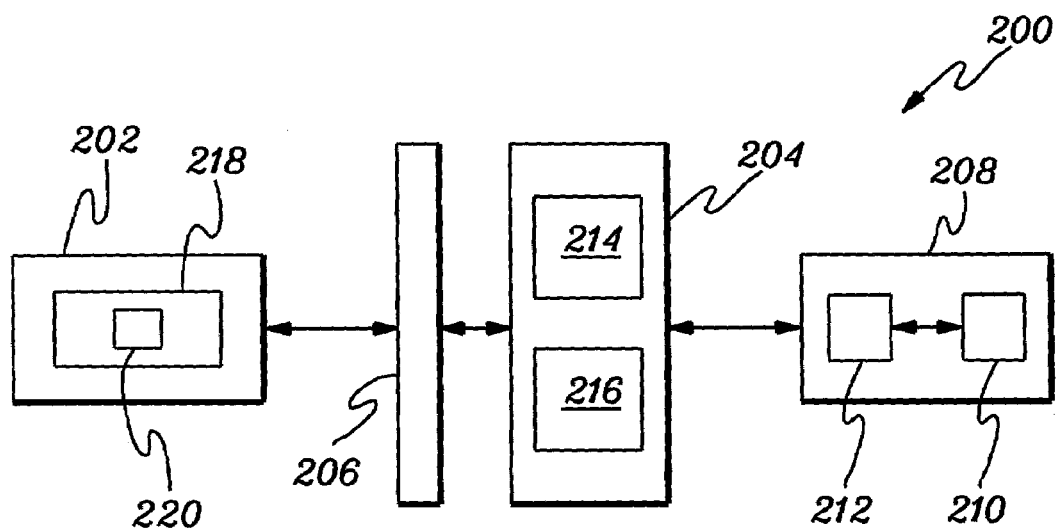
FIG. 2 depicts one example of a system in accordance with the present invention.

FIG. 2 is a block diagram of one example of a system 200 in accordance with the present invention. The system comprises a client computing unit 202, a communication server 204 with associated optional firewall 206, and an application server 208 running an SNA application 210. In addition, the application server comprises, in this example, a TN3270 server 212 (a comparatively thin server, as described more fully below). The optional firewall can be, for example, a separate piece of hardware, or the firewall can be software residing, for example, on the communication server. One skilled in the art will understand the operation of the firewall. Briefly, the firewall stops all traffic into and out of the communication server on the client side, except for any ports that have been opened, either fully opened or opened for specific traffic.

The communication server comprises, for example, a web server application 214, for example, IBM's HTTP Server, and another gateway 216 that acts as an intermediary between the client and the application server for purposes of communications between the client and the SNA application. Gateway 216, described more fully below, takes the form of, for example, a plug-in to the operating system kernel server (not shown), or a standard plug-in to web server application 214.

Client 202 comprises a browser application 218 such as, for example, Microsoft Internet Explorer or Netscape Navigator. A plug-in 220 for the browser acts as a client for the SNA application server. In one example, the plug-in is an enhancement to a 3270 screen emulator, such as, for example, Host On Demand from IBM. Typically, the emulator is embedded in the browser as a plug-in or an applet.

Figure 3:
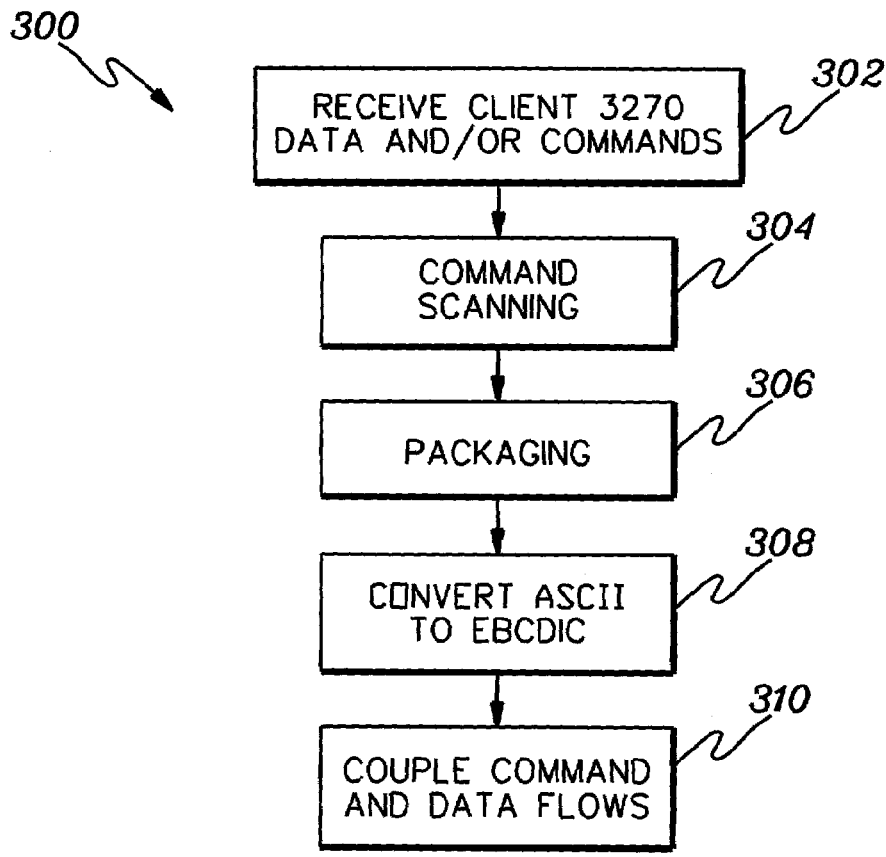
FIG. 3 is a flow diagram for one example of the operation of a plug-in for accomplishing TN3270 data format conversion and command scanning and packaging, in accordance with the present invention.

FIG. 3 is a high-level flow diagram 300 for one example of the operation of plug-in 220. The plug-in first receives 3270 data and/or command(s) from the client (step 302) in a single flow. The flow is scanned to identify any commands present therein (step 304). Any commands identified are separated from the data (step 306) into a separate flow. In addition, all data in ASCII format is converted to EBCDIC for later use by the SNA application (step 308). Finally, the command and data flows are coupled together for sending to communications server 204 (step 310) in a TN3270 session via, for example, TCP/IP and HTTP (Hypertext Transfer Protocol) over a standard port, for example, port 80. Another example of a current standard port is 8080, as well as others that may emerge in the future. Of course, a secure connection could be provided using, for example, SSL (Secure Sockets Layer) over standard port 443, providing an extra layer of security. The client may also use other protocols to transfer data to the communication server, such as, for example, SOAP (Simple Object Access Protocol).

In one example, the plug-in 220 is installed on client 202 directly by, for example, loading it from a physical storage medium (e.g., an optical storage medium). In another example, used below in the continuing description of the operation of system 200, plug-in 220 takes the form of an applet downloaded by the client from, for example, communication server 204, specifically, web server 214.

In the present example, the communication server is logically situated between the client and the application server. Although shown in FIG. 1 as a separate entity, it will be understood that the communication server could, for example, be physically part of the application server. Further, gateway 216 could also physically reside on a machine separate from the web server 214. Likewise, TN3270 server 212 could physically reside on a separate machine from the SNA application 210.

Figure 4:
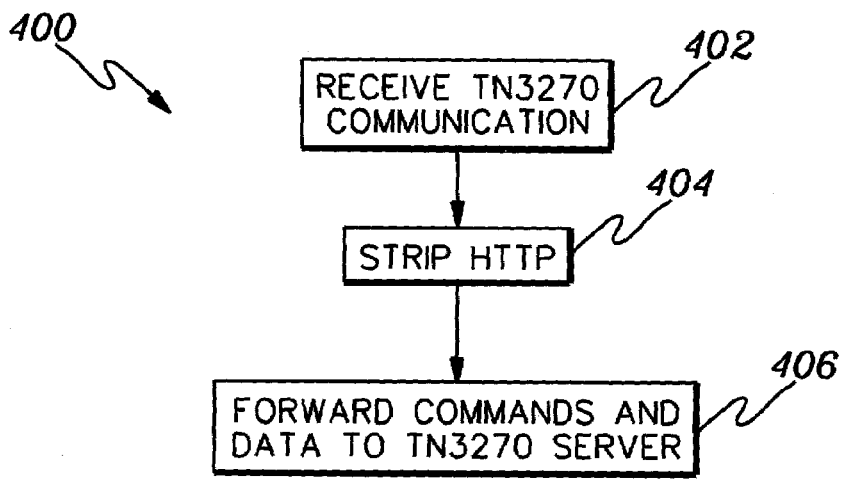
FIG. 4 is a flow diagram for one example of the operation of a plug-in for translating communications between a client and an SNA application server.

FIG. 4 is a flow diagram 400 of one example of the operation of gateway 216. Once a connection is made with client 202, the gateway receives a TN3270 communication, in the form of an HTTP request, from the client over the standard port (step 402). The gateway then parses the request and strips the TN3270 information from the HTTP headers and formatting in a conventional manner (step 404). The data and/or command flows are then forwarded to application server 208 (Step 406); specifically, to TN3270 server 212 residing on application server 208 over a non-standard port, for example, port 23. The connection to the application server can be initiated by the gateway, or an existing connection can be used.

The data and/or commands transferred between the gateway and the client on the one hand, and between the gateway and the TN3270 server on the other could be formatted using any number of web-based languages. For example, HTML (Hyper-Text Markup Language) or XML (Extensible Markup Language) could be used to format the information.

Figure 8:
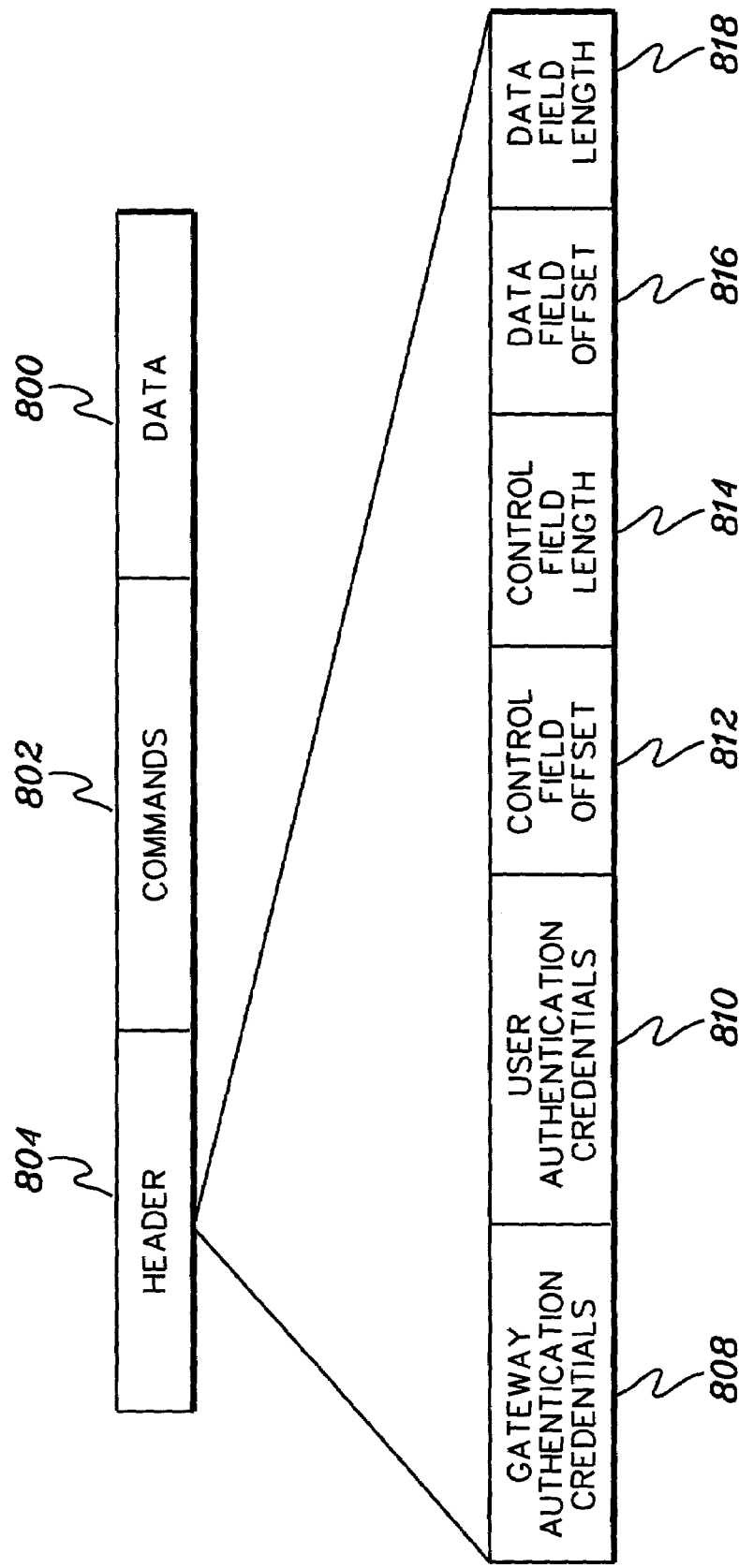
FIG. 8 depicts one example of the data and commands forwarded from the gateway to the application server are preferably delimited with a header.

The forwarding of the data and/or command(s) from gateway 216 to TN3270 server 212 over the non-standard port is accomplished, for example, using TCP/IP and a simple protocol, the operation of which will now be described. It will be understood, however, that other communications protocols could be used, for example, SOAP. The protocol used for communication between the gateway and the application server comprises the gateway communicating security credentials of the gateway, for example, a certificate, for initial setup of the gateway-to-application-server connection. Preferably, the client passes security information to the communication server during setup of a connection therewith. The gateway also preferably passes that information to the application server, or, as an alternative, maps the security credentials from the client to those understood by the application server. As shown in one example in FIG. 8, the data 800 and/or command(s) 802 forwarded from the gateway to the application server are preferably delimited with a header 804. In this example, header 804 includes gateway authentication credentials 808, client (user) authentication credentials 810, a command field offset 812, the length 814 of the command field, a data field offset 816 and a data field length 818. For example, the data destined for the SNA application is so delimited, as well as the commands destined for the TN3270 server. The headers are likewise used by the TN3270 server to delimitate data from the SNA application and commands back to the communication server. The communication server is able to strip the headers in order to send the data and commands via HTTP, for example, back to the client.

Once the 3270 data and/or command(s) reach application server 208, the operation of the application server is similar to that prior to the present invention, except that data format conversions and command scanning and packaging have already been done. In particular, TN3270 server 212 receives the data and/or command(s) over port 23. Any commands that are present are implemented, and the data is transported to the SNA application 210 via SNA.

The return trip for data from the SNA application 210 to the client 202 largely mirrors the trip from the client. Thus, data and commands are transferred from the SNA application to the TN3270 server via SNA. The TN3270 server uses TCP/IP and the special protocol described above to send the return data and commands over port 23 to gateway 216 in communication server 204. The information is then wrapped in HTTP (or other appropriate protocol) and sent by the gateway over the standard port to the client via TCP/IP. Once received by the client plug-in, the client plug-in then strips the data and commands from the HTTP, translates the EBCDIC data received into ASCII, and creates a composite flow with embedded commands in a format understood by the 3270 emulator resident on the client.

The basic scenario described with respect to FIG. 2 has other possible variations, depending on the model sought to be employed. For example, where a Web services model is employed, i.e., where communication with an SNA application server is provided as a service, one variation is where the functionality described with respect to plug-in 220 is instead performed by communication server 204 (e.g., by gateway 216). In such a scenario, the communication server acts as a Web services gateway or portal, while the client plug-in would merely enable a TN3270 session with the communication server over the standard port using HTTP, for example.

Figure 5:
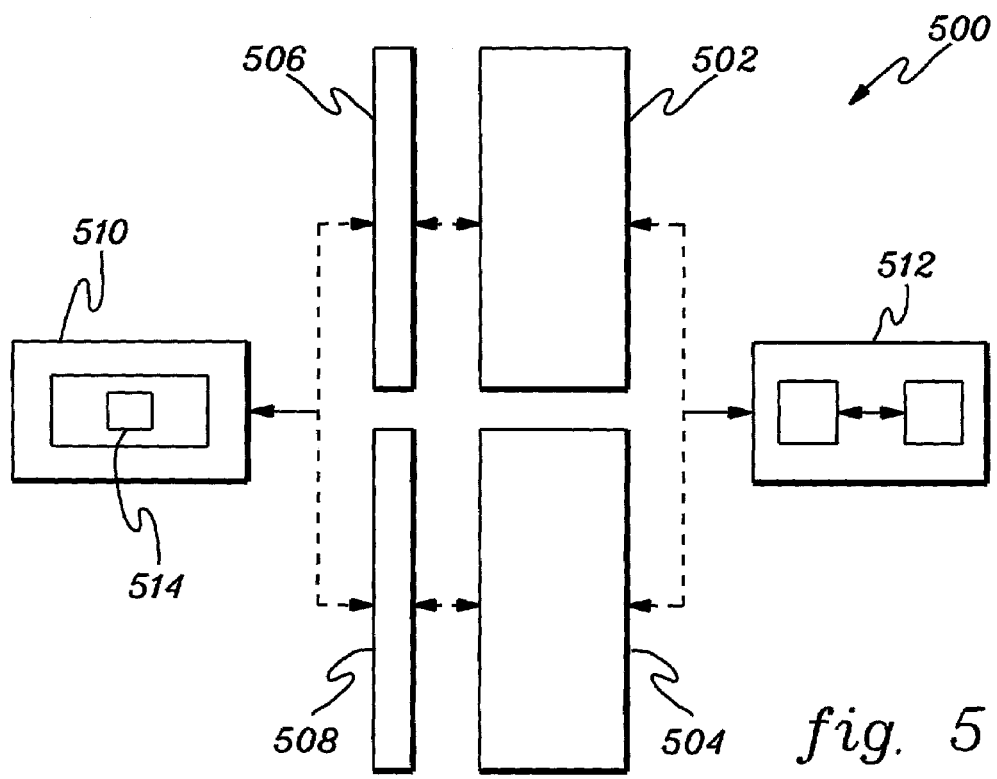
FIGS. 5–7 depict further example systems in accordance with the present invention.

FIG. 5 depicts another example of a system 500 in accordance with the present invention. System 500 differs from system 200 in FIG. 2 in that there are multiple communication servers. Here, two communication servers 502 and 504, each with an accompanying optional firewall 506 and 508, respectively, are shown for simplicity, but it will be understood that there could be more. The client 510, or a user at the client, chooses from among the communication servers for communicating with the application server 512, illustrated by dashed lines. The choice is made, for example, based on one or more predefined criteria. For example, in a services model, the choice could be based on price, quality, speed and/or or some other factor(s). The choice could also be random in nature. In addition, the client may use various means to locate a potential communication server, such as, for example, a search engine or UDDI (Universal Description Discovery and Integration; an Internet-based directory).

A variation based on FIG. 5 combines the TN3270 functionality relocation to the communication server with multiple communication servers. In such a scenario, the client plug-in 514 would merely enable a TN3270 session, and a choice would be made as to which communication server to use based, for example, on one or more predefined criteria, as described above.

Figure 6:
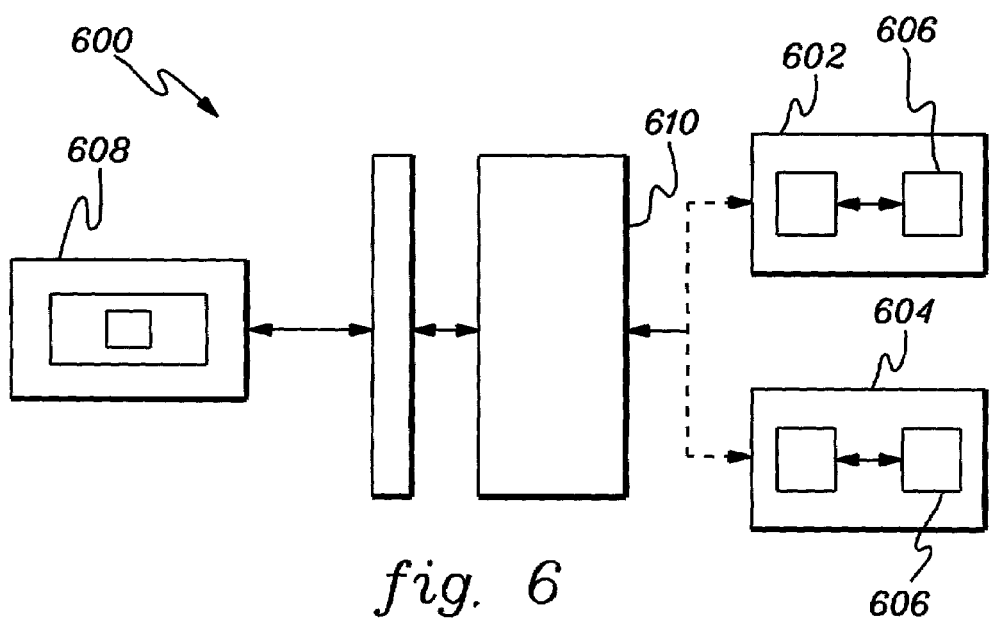

FIG. 6 depicts still another example of a system 600 in accordance with the present invention. FIG. 6 differs from FIG. 2 in that there are multiple application servers. Here, two application servers 602 and 604 are shown for simplicity, and are each running the same SNA application 606. In such a scenario, either the client 608 (or a user at the client) or the communication server 610 would choose, illustrated by dashed lines, from among the application servers for communications with the client. As with the example of FIG. 5, the choice is made, for example, based on one or more predefined criteria (e.g., price, quality, speed, etc.).

Figure 7:
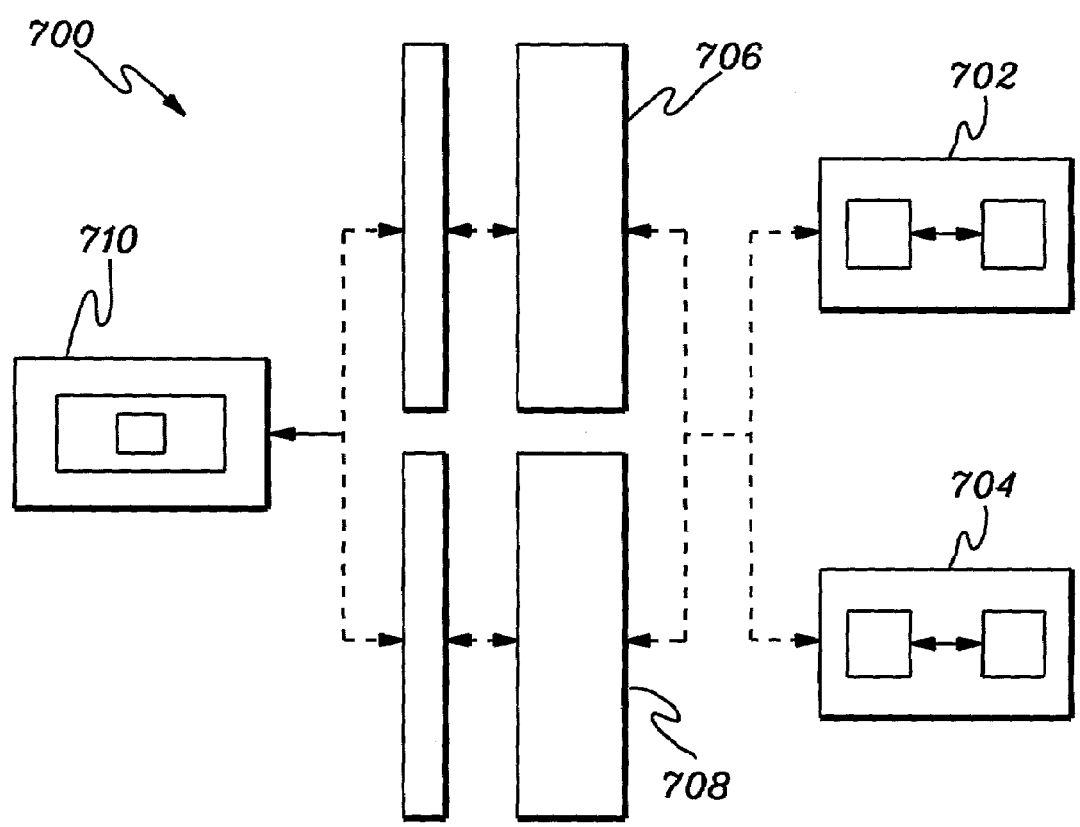

FIG. 7 depicts yet another example of a system 700 in accordance with the present invention. FIG. 7 combines aspects of the systems of FIGS. 5 and 6, in that there are both multiple communication servers and multiple application servers. Here, two application servers 702 and 704, and two communication servers 706 and 708 are shown for simplicity. Each of the application servers is running the same SNA application. However, the communication server chosen by the client 710 is obtaining different information from more than one of the application servers for aggregating and providing to the client.

An example variation based on FIG. 7 comprises the multiple application servers providing access to a different SNA applications. As in the preceding example, the communication server aggregates the various information for providing to the client. Of course, where the SNA applications are different, the plug-ins would have to be made to work with the different applications. Working with different applications could be made possible, for example, by a higher layer on the communication server (not necessarily the plug-in). As one example, the communication server could be a gateway or portal and use the same plug-in to initiate connections with multiple TN3270 servers and aggregate the data delivered to the client.

In another example variation on FIG. 7, the multiple application servers are each running the same SNA application. In such a scenario, either the client (or a user at the client) or the chosen communication server would choose from among the application servers. As above, the choice is made, for example, based on one or more predefined criteria.

Yet another example variation on FIG. 7 relocates the TN3270 functionality of the client plug-in of FIG. 2 to the communication servers.

In still another example variation on FIG. 7, the multiple application servers are each running a different SNA application. The chosen communication server communicates with more than one of the application servers, and aggregates the information obtained for providing to the client.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of enhancing application server performance in a network, comprising:
    identifying at least one performance-degrading process normally performed by at least one application; and
    processing the at least one performance-degrading process away from at least one application server running the at least one application;
    wherein performance of the at least one application server is enhanced by the processing.

2. The method of claim 1, wherein the at least one performance-degrading process comprises converting between one data format and another data format.

3. The method of claim 2, wherein the at least one application comprises an SNA application, and wherein the converting comprises converting between ASCII and EBCDIC.

4. The method of claim 1, wherein the at least one application comprises an SNA application, and wherein the at least one performance-degrading process comprises command scanning and packaging.

5. The method of claim 1, wherein the network comprises a client, and wherein the processing comprises processing at least one of the at least one performance-degrading process at the client.

6. The method of claim 5, wherein the processing of the at least one the at least one performance-degrading process is accomplished by a browser plug-in at the client.

7. The method of claim 1, wherein the at least one application communicates over a non-standard port, wherein the network further comprises a client, and wherein client communications with the at least one application take place over a standard port on the client.

8. The method of claim 1, wherein the network comprises a client and at least one communication server logically situated between the client and the at least one application server, wherein communications between the client and the at least one communication server take place over a standard port, and wherein communications between the at least one communication server and the at least one application server take place over a non-standard port.

9. The method of claim 8, wherein the at least one communication server comprises a plug-in for translating communications between the client and the at least one application server.

10. The method of claim 8, wherein the processing comprises processing at least one of the at least one performance-degrading process at the at least one communication server.

11. The method of claim 8, wherein the at least one communication server comprises a plurality of communication servers, the method further comprising choosing one of the plurality of communication servers for communicating with the at least one application server.

12. The method of claim 8, wherein the at least one application server comprises a plurality of application servers, the method further comprising choosing one of the plurality of application servers for communicating with the client.

13. The method of claim 8, wherein the at least one application server comprises a plurality of application servers, the plurality of application servers comprising at least two application servers, the at least one application running on the at least two application servers providing different information to the at least one communication server.

14. The method of claim 8, wherein the at least one communication server comprises a plurality of communication servers, the method further comprising choosing one of the plurality of communication servers for communicating with the at least one application server, and wherein the at least one application server comprises a plurality of application servers, the plurality of application servers comprising at least two application servers, the at least one application running on the at least two application servers providing different information to the at least one communication server.

15. A system of enhancing application server performance in a network, comprising:
    means for identifying at least one performance-degrading process normally performed by at least one application running on at least one application server; and
    means for processing the at least one performance-degrading process away from the at least one application server;
    wherein performance of the at least one application server is enhanced by the processing.

16. The system of claim 15, wherein the means for identifying comprises means for converting between one data format and another data format.

17. The system of claim 16, wherein the at least one application comprises an SNA application, and wherein the means for converting comprises means for converting between ASCII and EBCDIC.

18. The system of claim 15, wherein the at least one application comprises an SNA application, and wherein the means for identifying comprises means for command scanning and packaging.

19. The system of claim 15, wherein the network comprises a client, and wherein the means for processing comprises means for processing at least one of the at least one performance-degrading process at the client.

20. The system of claim 19, wherein the means for processing comprises a browser plug-in at the client.

21. The system of claim 15, wherein the network further comprises a client, wherein the at least one application server comprises a non-standard port for communications with the at least one application, and wherein the client comprises a standard port for communications with the client.

22. The system of claim 15, wherein the network further comprises a client and at least one communication server logically situated between the client and the at least one application server, wherein the at least one communication server comprises the standard port for communications with the client and the non-standard port for communications with the at least one application server.

23. The system of claim 22, wherein the at least one communication server comprises a plug-in for translating communications between the client and the at least one application server.

24. The system of claim 22, wherein the means for processing comprises means for processing at least one of the at least one performance-degrading process at the at least one communication server.

25. The system of claim 22, wherein the at least one communication server comprises a plurality of communication servers, the system further comprising means for choosing one of the plurality of communication servers for communicating with the at least one application server.

26. The system of claim 22, wherein the at least one application server comprises a plurality of application servers, the system further comprising means for choosing one of the plurality of application servers for communicating with the client.

27. The system of claim 22, wherein the at least one application server comprises a plurality of application servers, the plurality of application servers comprising at least two application servers, the at least one application running on the at least two application servers providing different information to the at least one communication server.

28. The system of claim 22, wherein the at least one communication server comprises a plurality of communication servers, the system further comprising means for choosing one of the plurality of communication servers for communicating with the at least one application server, and wherein the at least one application server comprises a plurality of application servers, the plurality of application servers comprising at least two application servers, the at least one application running on the at least two application servers providing different information to the at least one communication server.

29. At least one program storage device readable by a machine tangibly embodying at least one program of instructions executable by the machine to perform a method of enhancing application server performance in a network, comprising:
 identifying at least one performance-degrading process normally performed by at least one application; and
 processing the at least one performance-degrading process away from at least one application server running the at least one application;
 wherein performance of the at least one application server is enhanced by the processing.

30. The at least one program storage device of claim 29, wherein the at least one performance-degrading process comprises converting between one data format and another data format.

31. The at least one program storage device of claim 30, wherein the at least one application comprises an SNA application, and wherein the converting comprises converting between ASCII and EBCDIC.

32. The at least one program storage device of claim 29, wherein the at least one application comprises an SNA application, and wherein the at least one performance-degrading process comprises command scanning and packaging.

33. The at least one program storage device of claim 29, wherein the network comprises a client, and wherein the processing comprises processing at least one of the at least one performance-degrading process at the client.

34. The at least one program storage device of claim 33, wherein the processing of the at least one of the at least one performance-degrading process is accomplished by a browser plug-in at the client.

35. The at least one program storage device of claim 29, wherein the at least one application communicates over a non-standard port, wherein the network further comprises a client, and wherein client communications with the at least one application take place over a standard port on the client.

36. The at least one program storage device of claim 29, wherein the network comprises a client and at least one communication server logically situated between the client and the at least one application server, wherein communications between the client and the at least one communication server take place over a standard port, and wherein communications between the at least one communication server and the at least one application server take place over a non-standard port.

37. The at least one program storage device of claim 36, wherein the at least one communication server comprises a plug-in for translating communications between the client and the at least one application server.

38. The at least one program storage device of claim 36, wherein the processing comprises processing at least one of the at least one performance-degrading process at the at least one communication server.

39. The at least one program storage device of claim 36, wherein the at least one communication server comprises a plurality of communication servers, the method further comprising choosing one of the plurality of communication servers for communicating with the at least one application server.

40. The at least one program storage device of claim 36, wherein the at least one application server comprises a plurality of application servers, the method further comprising choosing one of the plurality of application servers for communicating with the client.

41. The at least one program storage device of claim 36, wherein the at least one application server comprises a plurality of application servers, the plurality of application servers comprising at least two application servers, the at least one application running on the at least two application servers providing different information to the at least one communication server.

42. The at least one program storage device of claim 36, wherein the at least one communication server comprises a plurality of conimunication servers, the method further comprising choosing one of the plurality of communication servers for communicating with the at least one application server, and wherein the at least one application server comprises a plurality of application servers, the plurality of application servers comprising at least two application servers, the at least one application running on the at least two application servers providing different information to the at least one communication server.

* * * * *